United States Patent
Imamura et al.

(10) Patent No.: US 9,030,111 B2
(45) Date of Patent: May 12, 2015

(54) HIGH PRESSURE DISCHARGE LAMP LIGHTING DEVICE WITH ELECTRODE TEMPERATURE CONTROL

(75) Inventors: Atsushi Imamura, Himeji (JP); Takanori Samejima, Himeji (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/580,525

(22) PCT Filed: Mar. 9, 2011

(86) PCT No.: PCT/JP2011/055473
§ 371 (c)(1),
(2), (4) Date: Aug. 22, 2012

(87) PCT Pub. No.: WO2011/122274
PCT Pub. Date: Oct. 6, 2011

(65) Prior Publication Data
US 2012/0313546 A1 Dec. 13, 2012

(30) Foreign Application Priority Data

Mar. 30, 2010 (JP) .................................. 2010-077638
Mar. 30, 2010 (JP) .................................. 2010-077639

(51) Int. Cl.
*H05B 41/36* (2006.01)
*H05B 41/292* (2006.01)
*H05B 41/288* (2006.01)

(52) U.S. Cl.
CPC ........ *H05B 41/2928* (2013.01); *H05B 41/2888* (2013.01); *Y02B 20/208* (2013.01)

(58) Field of Classification Search
CPC .......... H01J 61/00; H01J 61/822; H01J 61/84
USPC ............. 315/291, 224, 209 R, 246, 307, 308, 315/DIG. 5, DIG. 7, 106, 112, 194, 219, 315/225, 226, 247, 287, 289, 290, 360, 94; 313/485, 576, 595, 642; 353/107, 85, 353/98
See application file for complete search history.

(56) References Cited

U.S. PATENT DOCUMENTS 7,446,482 B2 * 11/2008 Sugaya ....................... 315/200 R
8,076,865 B2 * 12/2011 Johnsen et al. ............... 315/291

(Continued)

FOREIGN PATENT DOCUMENTS

| EP | 1624733 A2 * | 2/2006 |
| JP | 01-298682 A | 12/1989 |
| JP | 4-89627 A | 3/1992 |
| JP | 2006-59790 A | 3/2006 |
| JP | 2007-87637 A | 4/2007 |

(Continued)

*Primary Examiner* — Douglas W Owens
*Assistant Examiner* — Borna Alaeddini
(74) *Attorney, Agent, or Firm* — Roberts Mlotkowski Safran & Cole, P.C.; David S. Safran

(57) ABSTRACT

To maintain the shape of the projection on the electrodes of the tip end for a long time to extend the lifetime of a discharge lamp, a lighting device lighting a high pressure discharge lamp supplies alternating current such that an alternating current with a basic frequency at the time of the steady state lighting selected from a range between 60 and 1000 Hz and a low frequency of a half cycle with a frequency lower than the basic frequency are generated alternatingly. The alternating current is supplied such that the waveform with one polarity of the low frequency appears consecutively at least twice. It is also possible for the alternately generated low frequency to be lower than the basic frequency in a range from 5 to 200 Hz, and for the interval during which the basic frequency is supplied to be gradually increased and decreased at specified times.

9 Claims, 10 Drawing Sheets

(56) References Cited

U.S. PATENT DOCUMENTS

| | | | |
|---|---|---|---|
| 8,324,828 B2* | 12/2012 | Yamamoto et al. | 315/209 R |
| 2008/0297739 A1 | 12/2008 | Yamauchi et al. | |
| 2008/0315782 A1* | 12/2008 | Hirao | 315/224 |
| 2009/0289572 A1* | 11/2009 | Johnsen et al. | 315/287 |
| 2011/0025989 A1* | 2/2011 | Ono et al. | 315/287 |
| 2011/0128508 A1* | 6/2011 | Yamada et al. | 315/268 |

FOREIGN PATENT DOCUMENTS

| | | |
|---|---|---|
| JP | 2007-280734 A | 10/2007 |
| JP | 2008-153142 A | 7/2008 |
| JP | 2008-300309 A | 12/2008 |
| JP | 2009-110681 A | 5/2009 |
| JP | 2009-252352 A | 10/2009 |
| JP | 2010-251038 A | 11/2010 |

* cited by examiner

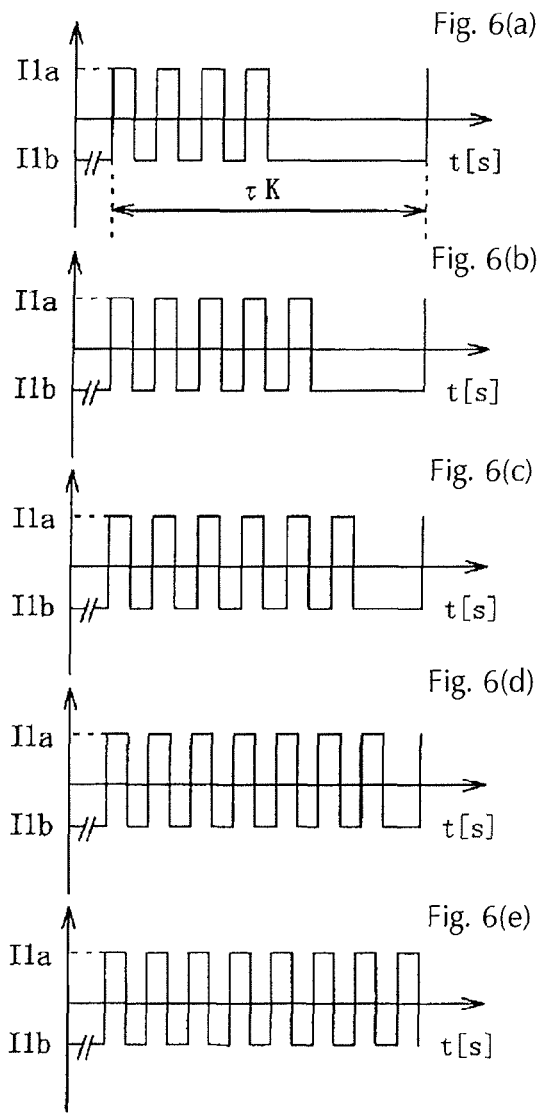
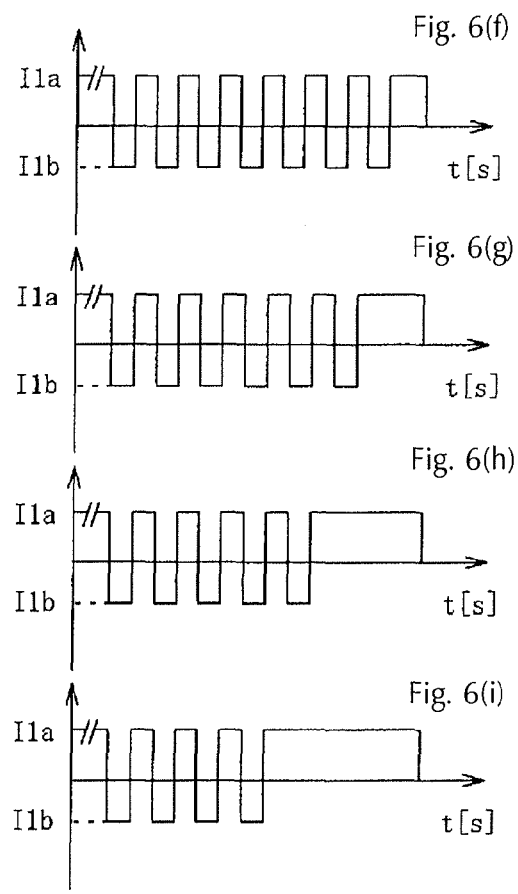

a → b → c → d  low frequency insertion interval decreasing
d → c → b → a  low frequency insertion interval increasing a → b → c  low frequency insertion interval decreasing
d → c → b  low frequency insertion interval increasing 37 cycles (100 ms)

Change of number of cycles ± 1 cycle/s

HIGH PRESSURE DISCHARGE LAMP LIGHTING DEVICE WITH ELECTRODE TEMPERATURE CONTROL

BACKGROUND OF THE INVENTION

1. Field of the Invention

This invention relates to a high pressure discharge lamp lighting device comprising a super high pressure discharge lamp optimally used as the light source for a projector, etc. and a power supply device.

2. Description of Related Art

Lamps used as the light source of a projector, etc., are super high pressure discharge lamps where at least 0.2 mg/mm$^3$ of mercury is enclosed in the interior of the discharge vessel and the pressure at the time of the lighting reaches at least 200 atm are utilized. It is known that, in such lamps, a projection is formed at the surface of the tip end of the electrodes when the lamp is lit and a stable lighting condition is maintained by holding the arc at these projections.

Now, if a high pressure discharge lamp remains lit in the same condition for a long time, a plurality of projections are formed and the tip end surface part of the electrodes may become uneven. It is known that, if the surface part of the electrode tip end is uneven, the discharge position becomes unstable and a reduction in brightness and flicker due to the movement of the arc.

As a solution for this problem, Japanese laid-open patent publication 2006-59790 describes a method of driving a discharge lamp wherein an alternating current with a frequency selected from a frequency range between 60 and 1000 Hz is supplied as the basic frequency at the steady state lighting and a lower frequency selected from the range between 5 and 200 Hz is supplied at specific intervals.

According to this technique, excessive tungsten adhered to the vicinity of the projections necessary for the discharge melts and the electrode tip ends are cleaned by supplying an alternating current such that the basic frequency being supplied at the time of the steady state lighting and a frequency being lower than the basic frequency are generated alternatingly; and because the shape of the projections can be maintained stable as the molten tungsten is supplied to the projections by means of the surface tension, is becomes possible to achieve a long lifetime of the electrodes.

Japanese laid-open patent publication 2007-280734 discloses a technique by means of which the lifetime of the electrodes is extended by changing the value of the frequency at the time of lighting. However, because the technique described in this patent publication constantly increases and decreases the frequency, over the course of time, there is the practical problem that an annoying noise is generated.

Further, Japanese patent 4089627 discloses a technique by means of which the wear of the electrodes is reduced and the lifetime of the lamp is extended by periodically changing the lamp power. However, with this technique, it is not possible to prevent brightness changes resulting from the power changes.

PROBLEMS TO BE SOLVED BY THE INVENTION

It is possible to maintain the shape of the projections of the electrodes stable by supplying a basic frequency alternating current and supplying an alternating current with a frequency being lower than the basic frequency in specified intervals such as described in Japanese laid-open patent publication 2006-59790, but even with this previous technique, the shape of the electrode tip ends in the vicinity of the projection part is worn and it becomes impossible to maintain a stable discharge if the lighting is continued for a longer period.

The reason for this is explained with regard to FIG. 16. In the state at the beginning of the lighting of the high pressure discharge lamp, a low frequency is supplied repeatedly in constant periods. When this low frequency power is supplied, the peripheral part of the projection is heated and unnecessary projections at the tip end surface of the electrodes 20$a$, 20$a$ are melted and supplied to the main projection 21 at the tip end, such as shown in FIG. 16($a$).

However, if the high pressure discharge lamp has been lit for a long period of time, the formation and melting of unnecessary projections is repeated in the same region because the parts (regions) being heated at the tip end of the electrodes 20$a$, 20$b$ are fixed, and as a result, tungsten is consumed in the vicinity of the projections 21 of the electrodes 20$a$, 20$b$, such as shown in FIG. 16($b$), and the shape of the tip end of the electrodes 20$a$, 20$b$ becomes distorted.

To avoid such a situation, it is necessary to induce a change in the electrode temperature, that is, to ensure that the heated portion of the electrode is not fixed at the tip end, such that the temperature of the rear portion of the electrode is increased and the area in which the melting and build-up occurs extends over a wide range.

To ensure that the heated portion of the electrode is not fixed, it simply suffices to extend the period of the supply of the low frequency.

However, even if the period of the low frequency is simply extended, there is the problem that the temperature of the projection tip end rises abruptly at the time of the increase of the temperature of the rear of the electrode and the projection wears off and decreases.

Thus, it is possible to maintain the shape of the projection stable by supplying an alternating current with a lower frequency than the basic frequency in specified intervals such as described in the patent literature example 1, but the problem arises that the shape of the electrode tip end in the periphery of the projection part wears off and it is not possible to maintain a stable discharge when the above procedure is continued for a long time.

The present invention was made to solve this problem, and the object to be solved by the invention is to provide a lighting device wherein the temperature control of the electrodes can be performed precisely, the shape of the projection of the electrode and the shape of the tip end can be maintained optimally for a long time and a long lifetime of the discharge lamp is achieved.

SUMMARY OF THE INVENTION

The above-mentioned object is solved by the present invention in the following way.

(1) In a lamp lighting device lighting a high pressure discharge lamp wherein mercury is enclosed and a pair of electrodes is disposed opposite each other in the interior of a discharge vessel made from quartz glass, an alternating current is supplied to the high pressure discharge lamp such that a frequency at the time of the steady state lighting (the frequency at the time of the steady state lighting is referred to as the 'basic frequency') and a low frequency alternating current of a half cycle with a lower frequency than the basic frequency appears alternatingly, and the alternating current is supplied such that half cycle wave forms with the same polarity appear consecutively at least twice such that the alternating current wave forms with the basic frequency are sandwiched.

That is, during the supply of the basic frequency alternating current, a low frequency alternating current of a half cycle having the same polarity is inserted in specified periods and the alternating current is supplied to the high pressure discharge lamp such that the alternating current of a half cycle with the same polarity appears consecutively at least twice.

The basic frequency alternating current is an alternating current having a frequency selected from a range between 60 and 1000 Hz, and the low frequency alternating current is an alternating current having a frequency that is lower than the frequency of the basic frequency alternating current and is selected from a range between 5 and 200 Hz. The interval from one generation of the low frequency alternating current to the generation of the next low frequency alternating current is at most 120 seconds.

By means of the consecutively repeated supply of a current of a half cycle with the same polarity having a low cycle frequency to one electrode, the temperature of the electrode at the side becoming the anode cycle can be increased as a whole and the tip end part can be melted (melting mode).

Then, the low frequency of the cathode cycle is consecutively inserted at the electrode of the opposite side and the temperature decreases further. Therefore, only a small amount of tungsten is melted during this period at the electrode of the side operating as the cathode and tungsten is built-up at the projection part (build-up mode).

The low frequency of the cathode cycle is supplied consecutively, but because the current with the basic frequency is supplied periodically, the temperature of the electrode does not decrease too much. By means of suitably changing the polarity of the electrode being supplied with the current having the low cycle frequency, it is possible to maintain the evaporation of tungsten and the build-up mode at both electrodes with a good balance, to maintain the shape of the projections (electrodes) optimally and to extend the lifetime of the light source.

Now, during the supply of the low frequency alternating current with one polarity, such as described above, it is also possible to gradually increase the frequency of the low frequency (that is, to gradually narrow the pulse width of the low frequency alternating current of a half cycle) until it becomes the same as the basic frequency and to gradually reduce the frequency (that is, to gradually enlarge the pulse width of the low frequency alternating current of a half cycle) after the polarity of the low frequency half cycle has been reverted to the other polarity at the time of the correspondence of the low frequency with the basic frequency.

(2) In a lamp lighting device, lighting a high pressure discharge lamp wherein mercury is enclosed and a pair of electrodes is disposed opposite each other in the interior of a discharge vessel made from quartz glass, the period of the supply of the basic frequency at the time of the steady state lighting and the period of the supply of the lower frequency are controlled such that they are changed gradually so that an excessive heating and melting of the electrode tip end does not occur.

Concretely, an alternating current is supplied from the power supply device provided in the lamp lighting device to the high pressure discharge lamp such that the frequency at the time of the steady state lighting (the basic frequency) and the lower frequency are generated alternatingly, and the period of the supply of the basic frequency is controlled such that it gradually increases and decreases with each specified time. That is, the period of the supply of the basic frequency is controlled such that it becomes gradually shorter (that is, the period of the supply of the lower frequency becomes gradually longer) and then the period of the supply of the basic frequency is controlled such that it becomes gradually longer (that is, the period of the supply of the low frequency becomes gradually shorter).

The basic frequency alternating current is an alternating current with a frequency selected from a range between 60 and 1000 Hz, and the lower frequency alternating current is an alternating current with a frequency that is lower than the frequency of the basic frequency alternating current and is selected from a range between 5 and 200 Hz and with a length of at least a half cycle, the low frequency at the time that the alternating currents of the basic frequency and the low frequency are generated alternatingly has a length of at most 5 cycles, and the interval from one generation of the low frequency current to the generation of the next low frequency alternating current is at most 120 seconds.

When the period of the supply of the frequency at the time of the steady state lighting (the basic frequency) is shortened, the number of times the low frequency alternating current is generated per unit time increases. By gradually increasing the number of times the low frequency alternating current is generated, the portion being heated at the electrode is gradually enlarged and the surface area of the electrode being heated to supply tungsten to the projection broadens. Of course, during the state in which the number of times of the supply of the low frequency is high, the electrode is worn off as a whole because of an overall increase of the temperature of the electrode.

Now further, the supply period of the basic frequency is changed such that it is gradually changed from a state in which the period of the supply of current with the basic frequency is short to a state in which it is long. By means of this, the number of times that the lower frequency is generated gradually decreases, the temperature of the electrode decreases and the wear of the electrode and the vanishing of the projection are suppressed.

By means of repeating this operation, a time period during which tungsten melts in a wide range and a time period during which there is no such melting are created alternatingly. In other words, the shape of the projection (electrode) is maintained optimally and the lifetime of the light source is extended by switching (temporally changing) the region in which the electrode is heated.

Then, by means of changing the periods of the supply of the current with the basic frequency and that with the low frequency not abruptly, but gradually, flicker of the lamp can be avoided.

That is, in case of a momentary switching from the basic frequency to the current having only the low cycle frequency, the same flicker as in case of the occurrence of a power change of the lamp will be perceived by the human eye because of the abrupt change of the frequency. When the change between the basic frequency and the low cycle frequency is periodic and a smooth change, it will not be perceived as flicker.

By means of the present invention the following results can be obtained.

(1) By supplying a low cycle frequency current of a half cycle a plurality of times consecutively to one electrode, and then, changing the polarity of the low frequency and supplying a low cycle frequency current of a half cycle a plurality of times to the other electrode, the melting of tungsten and the build-up of tungsten are performed alternatively among the one electrode and the other electrode, an evaporation and a build-up mode of tungsten with a good balance can be maintained, the shape of the projections (electrodes) can be kept optimally and the lifetime of the light source can be extended.

(2) By performing the polarity reversal such that the low cycle frequency is gradually approximated to the basic frequency, the temperature change of the electrodes becomes smooth and flicker at the time of the reversal can be reduced.

(3) By supplying a low cycle frequency current of a half cycle a plurality of times consecutively to one electrode and then changing the polarity of the low frequency and supplying a low cycle frequency current of a half cycle a plurality of times to the other electrode, the shape of the tip end of the electrodes can always be kept good, and the generation of flicker is reduced and a stable arc discharge can be maintained even if the power supplied to the high pressure discharge lamp should be approximately 70% of the power at the time of the steady state lighting.

(4) By controlling a lighting device lighting a high pressure discharge lamp wherein mercury is enclosed and a pair of electrodes is disposed opposite each other in the discharge vessel such that the period of the supply of the basic frequency gradually increases and decreases with each specified time, a time period during which tungsten melts in a wide range and a time period during which there is no such melting can be created alternatingly, the shape of the projections of the electrodes can be kept optimally and the lifetime of the light source can be extended.

(5) By controlling the period of the supply of the basic frequency current so that it is not changed abruptly, but is increased and decreased gradually, flicker of the lamp can be avoided. Then, by slowly and gradually changing the period of the basic frequency, abrupt changes of the projection parts hardly occur and also sudden fluctuations of the lamp voltage hardly occur.

BRIEF DESCRIPTION OF THE DRAWINGS

FIGS. 6(a)-6(i) are views showing another example of the waveform of the lamp current according to the first embodiment of the present invention;

DETAILED DESCRIPTION OF THE INVENTION

Figure 1:
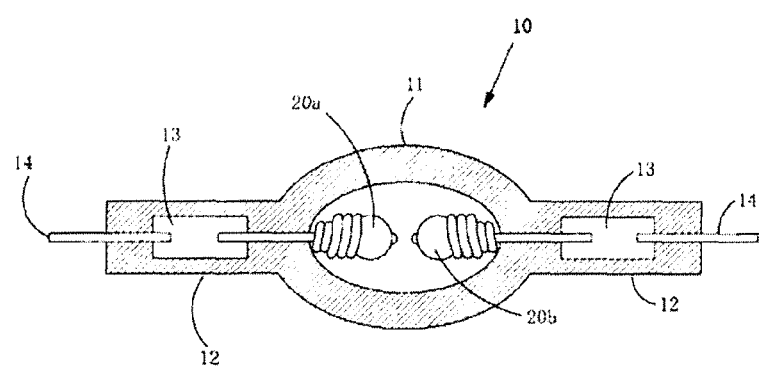
FIG. 1 is a sectional view of a high pressure discharge lamp according to present invention.

FIG. 1 is a sectional view of a high pressure discharge lamp 10 according to invention of the present invention that has an approximately spherical light emission part 11 formed by a discharge vessel made from quartz glass. In the interior of this light emission part 11, two electrodes 20a, 20b are arranged opposite each other with an extremely small spacing of at most 2 mm. A sealing portion 12 is formed at each end part of the light emission part 1. A metal foil 13 made from molybdenum is embedded air-tightly in the sealing portion 12 by means of, for example, shrink sealing. The shaft part of the electrodes 20a, 20b is connected to one end of the metal foil 13, and an external lead is connected to the opposite end of the metal foil 13. Power is supplied from a power supply device 30.

Mercury, a noble gas and a halogen are enclosed in the light emission part 11. Mercury serves to produce radiation light with the necessary visible light wavelength, for example, a wavelength from 360 to 780 nm. To give a concrete value, at least 0.20 mg/mm$^3$ of mercury are enclosed. Although the enclosed amount differs according to the temperature conditions, the pressure in the interior of the discharge vessel during lighting is a high vapor pressure of at least 200 atm. By enclosing even more mercury, high pressure discharge lamps with a high mercury vapor pressure of at least 250 atm or at least 300 atm during lighting can be produced, and with the increase of the mercury vapor pressure light, sources suitable for projectors can be implemented.

The noble gas, for example, argon gas, is enclosed in an amount of approximately 13 kPa to improve the lighting starting characteristics.

As to the halogen, iodine, bromine or chlorine is enclosed in compound form with mercury or another metal. The enclosed halogen amount is selected in a range of from $10^{-6}$ mol/mm$^3$ to $10^{-2}$ mol/mm$^3$. The function of the halogen is to extend the operational lifetime of the lamp by utilizing the so-called halogen cycle, and in case of extremely small-scale lamps with an extremely high lighting vapor pressure, such as the high pressure discharge lamp of the present invention, it has also the effect of preventing devitrification of the discharge vessel.

To give numerical values for the high pressure discharge lamp, for example, the maximum outer diameter of the light emission part is 9.4 mm, the electrode spacing is 1.0 mm, the internal volume of the discharge vessel is 55 mm$^3$, the rated voltage is 70 V, the rated current is 180 W and the power is supplied by means of an alternating current.

This kind of high pressure discharge lamp is installed in projectors, the size of which is being increasingly reduced, and while an extremely small size is requested with regard to the overall dimensions, on the other hand, also a high light emission and light intensity are demanded. Therefore, the thermal influence in the light emission part becomes great. The tube wall load value of the lamp becomes 0.8 to 2.5 W/mm$^2$ and concretely 2.4 W/mm$^2$.

When a lamp having such a high mercury vapor pressure and tube wall load value is mounted in a presentation device, such as a projector or an overhead projector, radiated light can be provided with a good color rendering property.

Figure 2:
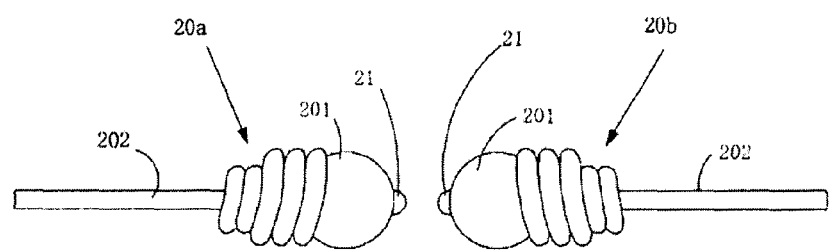
FIG. 2 is a schematic view of the tip ends of the electrodes according to the present invention.

FIG. 2 is an explanatory view wherein the tip ends of the electrodes shown in FIG. 1 are shown schematically, and shows the projections formed at the electrode tip ends during the operation of the lamp. The electrodes 20a, 20b each comprise a spherical part 201 and a shaft part 202, and a projection 21 is formed at the tip end of the spherical part 201. This projection 21 is formed by a condensation of molten tungsten at the electrode tip end when the lamp is lit.

Figure 3:
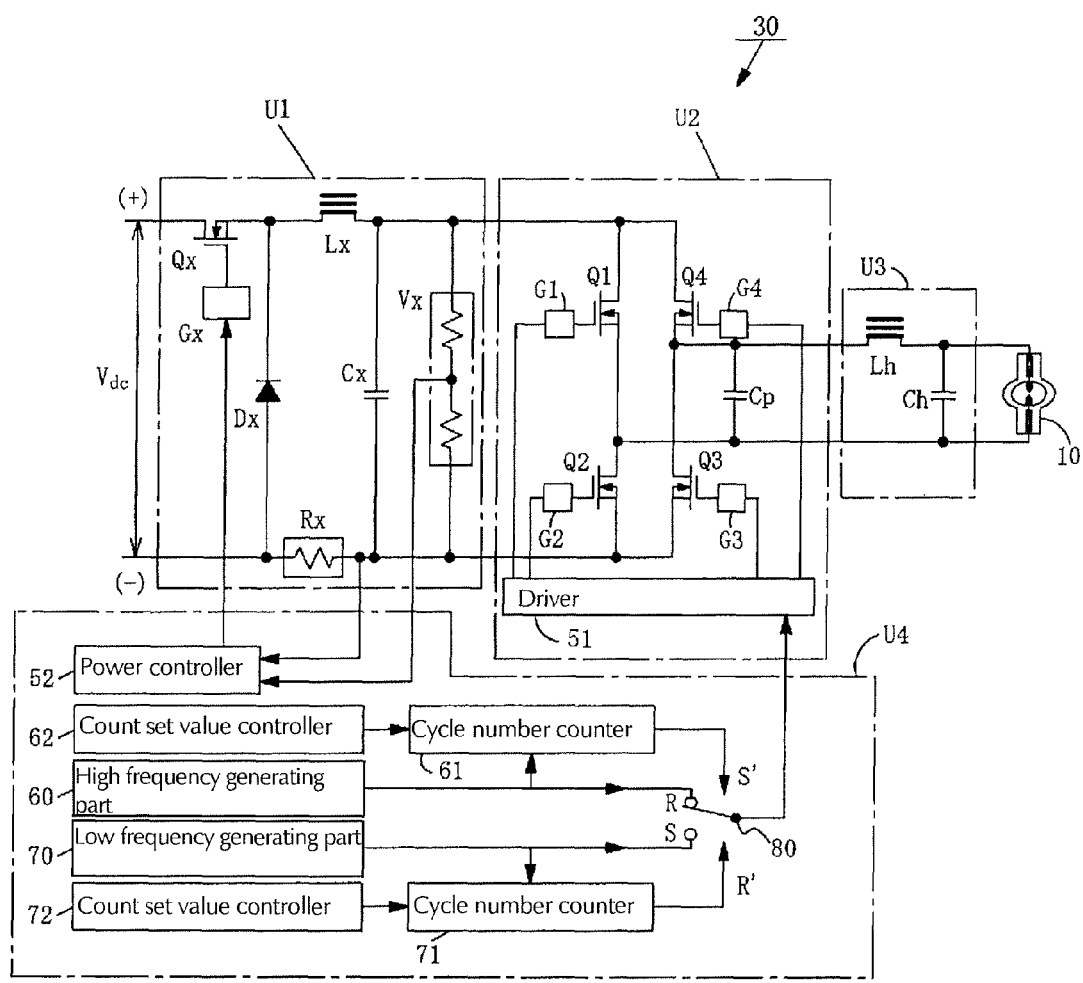
FIG. 3 is a circuit diagram of the power supply device for lighting the high pressure discharge lamp of the present invention.

Next, the lamp lighting device according to invention of the present invention is explained with regard to FIG. 3. In FIG. 3, the lamp lighting device comprises a power supply device 30 for lighting the high pressure discharge lamp 10.

The power supply device 30 comprises a step-down chopper circuit U1 that is supplied with a direct current voltage Vdc and reduces it, a full bridge inverter circuit U2 (in the following referred to as 'full bridge circuit') that is connected to the output side of the step-down chopper circuit U1, transforming the direct current voltage into an alternating current voltage and supplying it to the discharge lamp 10, a starter circuit U3 having a coil Lh and a capacitor Ch which are connected in series to the high pressure discharge lamp 10, a driver 51 that drives switching elements Q1 to Q4 of the full bridge circuit U2, and a controller U4.

The controller U4 may be formed by a processing device such as, for example, a microprocessor, and the functions and the configuration thereof are represented in this drawing by means of a block diagram.

In FIG. 3, the step-down chopper circuit U1 comprises a switching element Qx and an inductor Lx that is connected to the positive side power source terminal and that is supplied with direct current voltage Vdc, a diode Dx, the cathode side thereof being connected between the connection point of the switching element Qx and the inductor Lx and the negative side power source terminal, a smoothing capacitor Cx that is connected to the output side of the inductor Lx, and a resistor Rx for the current detection that is connected between the negative side of the smoothing capacitor Cx and the anode side of the diode Dx.

The switching element Qx is driven by the gate signal Gx outputted by the controller U4, and by driving the switching element Qx with a specified duty, the input direct current voltage Vdc is stepped down to a voltage corresponding to this duty. At the output side of the step-down chopper circuit U1, a series circuit Vx of a resistor for the voltage detection is provided.

The full bridge circuit U2 comprises the switching elements Q1 to Q4 which are connected bridge-shaped. These switching elements Q1 to Q4 are driven by gate signals G1 to G4 outputted by the driver 51, and by means of bringing the switching elements Q1, Q4 and the switching elements Q2, Q3, which are arranged at opposing corners, into the on state alternatingly, a rectangular wave shaped alternating current is generated between the connection point of the switching elements Q1, Q2 and the connection point of the switching elements Q3, Q4.

The starter circuit U3 comprises a coil Lh and a capacitor Ch. By outputting the resonant frequency of the resonant circuit formed of the coil Lh and the capacitor Ch from the bridge circuit U2, a high voltage can be generated in the capacitor Ch because of the resonance effect thereof.

Therefore, the starter circuit U3 is operated with a high frequency only at the time of starting, the high voltage is applied to both ends of the discharge lamp 10, and the lamp is lighted.

When, in said circuit, the drive frequency of the full bridge circuit U2 is changed at the time of the steady state lighting of the lamp, this can be effected by regulating the switching period of the switching elements Q1 to Q4 of the full bridge circuit U2 or by regulating the operating duty of the switching element Qx of the step-down chopper circuit U1 by the output voltage.

The switching element Qx of the step-down chopper circuit U1 is switched on/off according to the duty of the gate signal Gx outputted by the controller U4, and the power supplied to the lamp 10 changes. That is, in case of powering up, the duty of Qx is decreased and the control of the gate signal Gx is performed such that a power value corresponding to the inputted power regulation signal value is obtained.

The controller U4 comprises a power controller 52 controlling the lamp power, a high frequency generating part 60 generating a signal of a high frequency (the basic frequency), a first cycle number counter 61 counting the number of cycles of the high frequency signal outputted by the high frequency generating part 60, a first count set value controller 62 holding a set value for the count value of the high frequency signal outputted by the high frequency generating part 60, a low frequency generating part 70 generating a low frequency signal with a frequency being lower than the basic frequency, a second cycle number counter 71 counting the number of cycles of the low frequency signal outputted by the low frequency generating part 70, a second count set value controller 72 holding a set value for the count value of the low frequency signal outputted by the low frequency generating part 70, and a selector 80 selectively outputting one of the outputs of the high frequency generating part 60 and the low frequency generating part 70 to the driver 51.

The power controller 52 determines the lamp current I and the lamp voltage V from the voltage at both ends of the resistor Rx for the current detection and the voltage outputted by the resistor Vx for the voltage detection and calculates the lamp power and controls the duty of the switching element Qx of the step-down chopper circuit U1 such that this power corresponds to the lighting power command.

In the following, a first and a second embodiments of the present invention for the high pressure discharge lamp lighting device described in FIGS. 1 to 3 will be explained.

The drive frequency output from the full bridge part U2 in the first embodiment is based on a waveform wherein a high frequency (the basic frequency) and a low frequency being lower than that are combined, and for example, an implementation of the low frequency for only 0.5 cycle after the high frequency has been implemented for a specified time or a specified number of cycles is repeated in a chronological order.

Here, the high frequency is the basic frequency when the high pressure discharge lamp is lit steadily, and the low frequency is the frequency of the alternating current being supplied at the steady state lighting.

As is disclosed in Japanese laid-open patent publication 2006-59790, the basic frequency is selected from a range between 60 and 1000 Hz, and the low frequency is a frequency which is lower that the basic frequency being selected from the range between 60 and 1000 Hz, and which is selected from a range between 5 and 200 Hz.

The low frequency has a length of a half cycle, and the interval from one generation of the alternating current with the low frequency to the next generation of the alternating current with the low frequency is at most 120 seconds (0.01 second to 120 seconds). The frequency and the interval for the insertion of the low frequency are chosen in relation to the design of the discharge lamp and especially the thermal design of the electrodes.

As is described in Japanese laid-open patent publication 2006-59790, by means of supplying an alternating current with a waveform wherein the high frequency and the low frequency are combined it becomes possible to melt the electrode tip end part by supplying the low frequency alternating current and to prevent the generation of unnecessary projections except the projection becoming the point of origin of the arc.

The drive signals for the full bridge circuit part U2 are determined in the controller U4 as follows.

In FIG. 3, first a rectangular wave signal having a duty (on/off rate) of 50% is generated and outputted by the high frequency generating part 60 at a high frequency (the basic frequency). If the R-side is selected by the selector 80 the signal of the high frequency generating part 60 is sent via the selector 80 to the driver 51.

In this manner, the gate signals G1 to G4 are supplied from the driver 51 to the switching elements Q1 to Q4 of the full bridge circuit part U2, and the switching elements Q1 to Q4 are driven with a frequency corresponding to the high frequency signal. Then a rectangular wave-shaped alternating current voltage with the frequency of the high frequency signal is generated by the full bridge circuit part U2. This alternating current voltage is supplied to the discharge lamp 10.

The number of cycles of the high frequency signal from the high frequency generating part 60 is counted by the cycle number counter 61. The count set value controller 62 has the function of holding a set value for the cycle number counter 61, and if the number of cycles counted by the cycle number counter 61 corresponds to said set value, that is, when the implementation of the high frequency signal for a specified number of cycles has ended, a signal S' is outputted by the counter and the selector 80 switches to the S-side. At the same time the operation of the high frequency generating part 60 is stopped and the low frequency generating part 70 is started.

A rectangular wave signal having a duty of 50% is generated and output from the low frequency generating part 70 at a low frequency. When the selector 80 switches to the S-side, the low frequency signal output from the low frequency generating part 70 is sent to the driver 51. In this manner, gate signals G1 to G4 are supplied from the driver 51 to the switching elements Q1 to Q4 of the full bridge circuit part U2, and the switching elements Q1 to Q4 are driven with a frequency corresponding to the low frequency signal. Then, a rectangular wave-shaped alternating current voltage with the frequency of the low frequency signal is generated by the full bridge circuit part U2. This alternating current voltage is supplied to the discharge lamp 10.

At the same time, the number of cycles of the signal from the low frequency generating part 70 is counted by the cycle number counter 71. The count set value controller 72 has the function of holding a set value for the cycle number counter 71, and if the cycle number counter 71 corresponds to said set value (0.5 cycle), that is, when the implementation of the low frequency signal for a specified number of cycles has ended, a signal R' is output by the counter, the selector 80 switches to the R-side, the low frequency generating part 70 is stopped and the high frequency generating part 60 is started. As a result, an output from the high frequency generating part 60 is sent to the driver 51, and the full bridge circuit part U2 again outputs the alternating current voltage with the high frequency.

In the following, the example established in the foregoing is shown:
high frequency generating part 60: 370 Hz
count set value controller 62: 10.5 cycles
low frequency generating part 70: 90 Hz
count set value controller 72: 0.5 cycle The control process of the present implementation is characterized in that said count set value controllers 62, 72 are switched or controlled sequentially over the course of time and it is possible to change them during lighting. When, for example, the low frequency is arranged at one side of the electrodes, only under the indicated parameters and a specified time has passed, the low frequency is arranged unilaterally at the other electrode. This is possible by changing the count set value controller 62 from 10.5 cycles to 11 cycles only once. The sequence control of sequence thereof is performed by the count set value controller 62.

Figure 4A:
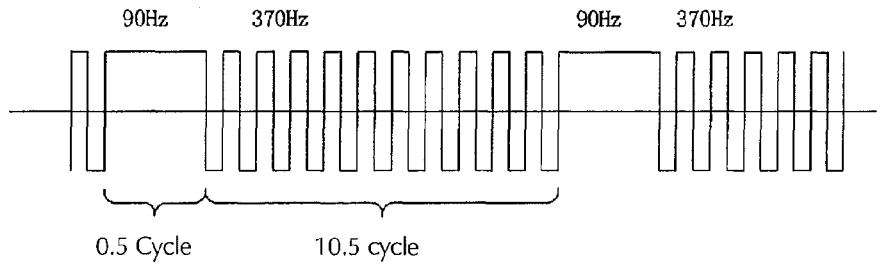
FIGS. 4(a) & 4(b) are views showing an example of the waveform of the lamp current supplied to the high pressure discharge lamp from a power supply device according to a first embodiment of the present invention.
Figure 4B:
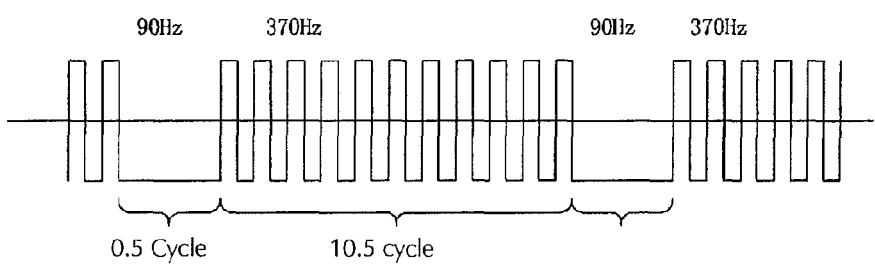

FIGS. 4(a) and 4(b) show an example of the output waveform before and after the polarity change. In the drawing, the vertical axis represents the current while the horizontal axis represents time. After the output waveform of FIG. 4(a) has been maintained for, for example, 5 s (seconds), the number of cycles of the basic frequency is changed to 11 cycles (omitted in the figure), the polarity of the low cycle frequency is reverted and the waveform of FIG. 4(b) is formed. This period also is maintained for, for example, 5 s.

As is shown in FIG. 4(a) or in FIG. 4(b), the period during which the low frequency with one polarity is supplied consecutively is not required to be 5 s, it suffices if it is a period of time selected from the range of 0.5 s to 10 s.

The specification of the lamp used in the present implementation and the operating conditions of the lamp are as follows.

When the lamp was lit as shown in FIG. 4 under the following specification and conditions such that the low frequency alternating current of a half cycle was inserted while the alternating current with the basic frequency was supplied, and for this low frequency alternating current, an alternating current of a half cycle and with the same polarity was supplied at least twice consecutively to the electrode of the high pressure discharge lamp, it was possible to maintain the tungsten evaporation and build-up modes with a good balance and to keep the shape of the projections (electrodes) optimally.

Specification of the lamp according to the implementation:
rated power: 270 W
rated voltage: 80 V
internal volume of the light emission part: 80 mm$^3$
electrode spacing: 1.2 mm
Enclosed substances
amount of mercury: 280 mg/mm$^3$
noble gas (concretely argon gas): 13 kPa
halogen amount (e.g., iodine, bromine, chlorine): $10^{-6}$ to $10^{-2}$ μmol/mm$^3$
Operating conditions of the lamp
basic frequency: 370 Hz
low cycle frequency: 46.25 Hz
insertion interval of low frequency: 200 ms
holding time (at one polarity): 1 s FIGS. 5(a) to 5(c) are views for explaining the temperature changes at the electrode tip ends.

Figure 5A:
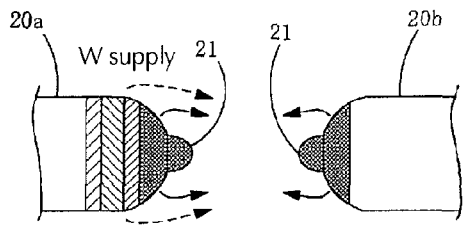
FIG. 5(a)-5(c) are views for explaining the temperature state and the wear state of the electrode tip ends according to the first embodiment of the present invention.
Figure 5B:
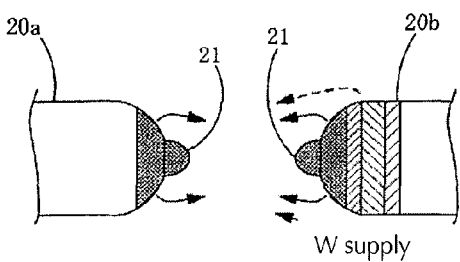
Figure 5C:
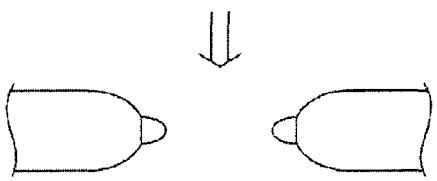

First, in FIG. 5(a), the temperature of the electrode 20a of the side at which the half cycle low frequency is arranged and which becomes the anode cycle (the electrode sending out the power, that is, the electrode becoming the plus side by being supplied with the half cycle low frequency) increases. Because directly after the supply of the alternating current with the low frequency, the alternating current with the basic frequency that is a high frequency is supplied, the state of the relatively high electrode temperature is maintained. In this state, the next low frequency current with the same polarity is supplied. Because the amount of the heating becomes higher with the increase of the frequency received by the electrodes, the electrode of the side sending out the power is heated while the electrode of the side receiving the power is not heated.

During such a supply, for example, 5 s, the temperature of the electrode tip end increases and tungsten making up the projection par 21 starts to melt (W melting mode).

In the meantime, the other electrode 20b of the side becoming the cathode cycle is supplied with current having the basic frequency, but because a current with a low frequency having the opposite polarity is supplied, it reaches a comparatively low temperature, the temperature of the projection 21 is comparatively low and tungsten (W) builds up at the projection 21(W build-up mode).

Thereafter, when the polarity is reversed and the half cycle low frequency is arranged at the side of the other electrode 20b, the temperature of the tip end of electrode 20b rises, such as is shown in FIG. 5(b), and tungsten making up the projection 21 starts to melt (W melting mode).

In this way, the alternating current is supplied such that the waveform with the low frequency having one polarity appears at least twice consecutively sandwiching the alternating current waveform with the basic frequency, so that the melting of tungsten and the build-up of tungsten are performed alternatingly between the one and the other electrode. In this manner, the shape of the electrode tip ends can be maintained in a good condition such as is shown in FIG. 5(c).

Because this polarity reversal operation duration in a range of, for example, 0.5 to 10 s and is performed smoothly, the generation of phenomena associated with the polarity reversal such as flicker can be avoided.

When the low frequency is supplied while the polarity of the low frequency is changed alternatingly, one electrode is heated at the time of one polarity, but the other electrode is not heated and the temperature thereof is reduced. Therefore, when the polarity is changed alternatingly, the electrodes are heated and cooled repeatedly and the temperature does not rise so much that tungsten is melted. By repeatedly supplying a voltage with the same polarity to one electrode, such as in the present implementation, the electrode temperature of the electrode at which the low frequency is arranged (the electrode at the side sending out the power) can be increased, such as was described above.

Desirably, the period(s) of the generation of the basic frequency, the period(s) of the generation of the low cycle frequency and the period of the consecutive insertion of the low frequency with the same polarity (referred to as 'holding time') are set such that the following conditions 1 and 2 are satisfied.

Condition 1: The period(s) of the generation of the basic frequency is at least the same as and at most a hundred times the period(s) of the generation of the low cycle frequency.

Condition 2: The period of the consecutive insertion of a low frequency with the same polarity (the holding time) is at least 0.5 s and at most 20 s.

The setting, such as in said condition 1, is done for the following reasons. If the period of the generation of the basic frequency is too short, the low cycle frequency is generated quite often, and therefore, the speed of the temperature increase of the electrode becomes too high, the electrode tip end temperature increases abruptly, and the shape of the projection becomes distorted. When the period of the generation of the basic frequency is the same as the period(s) of the generation of the low cycle frequency or longer than that, the increase of the tip end temperature is suppressed and the projection can be maintained.

Therefore, the period(s) of the generation of the basic frequency is preferably at least the same as the period(s) of the generation of the low cycle frequency.

If, on the other hand, the period of the generation of the basic frequency is too long, the effect of increasing the temperature of the electrode is not obtained and the shape of the projections at both electrodes becomes distorted. When the period(s) of the generation of the basic frequency is at most a hundred times the period(s) of the generation of the low cycle frequency, the effect of a temperature increase is obtained at the electrode operating as the anode at the time of the low cycle frequency and the projection can be maintained.

Thus, the period(s) of the generation of the basic frequency desirably is at least the same as and at most a hundred times the period(s) of the generation of the low cycle frequency.

The setting, such as in condition 2, is done for the following reasons. If the holding time for the consecutive insertion of a low frequency with the same polarity (the period of the consecutive insertion of a low frequency with the same polarity) is too short, the effect of increasing the temperature of the electrode becomes small, the electrode tip end tapers and the shape of the electrode cannot be maintained.

For example, a holding time of 0.2 s is too short and an insufficient effect is obtained. If the holding time is set to 0.5 s, it happens that the effect of a temperature increase is obtained at the anode cycle sided electrode during the period of the low cycle frequency. Because the polarity is switched at 0.5 s, naturally the electrode tip end temperature can be brought to an appropriate region at both electrodes and the projections can be maintained.

If the holding time is too long, the temperature of the anode cycle sided electrode becomes too high and the projection melts and vanishes. Also, as the result of the temperature having become too low at the electrode being the cathode side, tungsten is not supplied to the electrode tip end, the wear-off mode occurs and the shape of the projection becomes distorted.

When the holding time is set to, for example, 50 s, the projection at the anode cycle sided electrode melts and the temperature at the electrode being the cathode side becomes too low and the projection becomes distorted.

When the holding time is set to 20 s, the anode cycle sided electrode can be maintained at an appropriate temperature and also the shape of the projection can be maintained. Also, because the electrode being the cathode changes to the anode cycle with a cycle of 20 s, the temperature does not become too low and an appropriate shape of the projection can be maintained.

In the above description. it has been explained that a discharge lamp is supplied with an alternating current wherein a low frequency having one polarity appears with a specified period during the basic frequency at a specified time, and an alternating current wherein a low frequency having the other polarity appears with a specified period during the basic frequency at the next specified time. Now, an example where the polarity of the low frequency is not changed step-like but is rather changed smoothly from the low frequency having one polarity to the low frequency having the other polarity will be explained with reference to FIG. 6.

FIG. 6 is a simplified timing diagram of a mode of an implementation of the current waveform to the discharge lamp according to the present implementation.

For the reversal of the polarity of an asymmetrical waveform, the waveform of FIG. 6 expresses the situation wherein the waveform is changed from (a) to (i) while taking a specified time. In the drawing, a control is performed such that the reversal of the polarity of the asymmetrical waveform is done gradually, and the current value I1b and the current value I1a have the same amperage.

In this example, the switching from the low frequency with one polarity to the low frequency with the other polarity is done by controlling such that the pulse width of the low frequency with one polarity is decreased gradually such as shown in (a) to (d) of the drawing, the low frequency does not appear during the high frequency at (e), and the pulse of the low frequency with the other polarity is increased gradually in (f) to (i). This control can be effected by changing the frequency of the low frequency generating part 70 in FIG. 3.

By this means, the reversal of the polarity of the half cycle low frequency can be done with only small fluctuations of the arc of the discharge lamp and without worries with regard to a motion of the point of origin.

Because, as was explained above, the shape of the electrode tip ends can be maintained good at all times by using the lamp current waveform according to the present implementation, there are also the side effects that flicker can be reduced even if the power supplied to the high pressure discharge lamp is a power of approximately 70% of that at the time of the steady state lighting, and a stable arc discharge can be maintained.

Figure 7A:
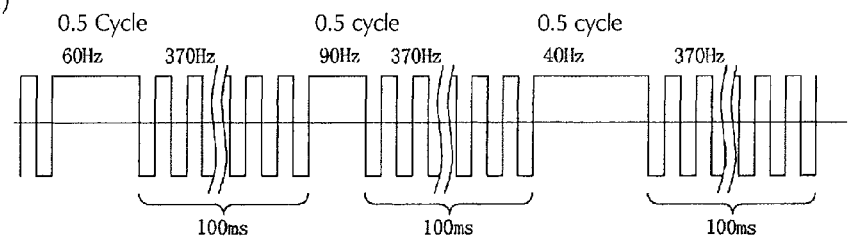
FIGS. 7(a) & 7(b) are views showing another example of the waveform of the lamp current according to the first embodiment of the present invention.
Figure 7B:
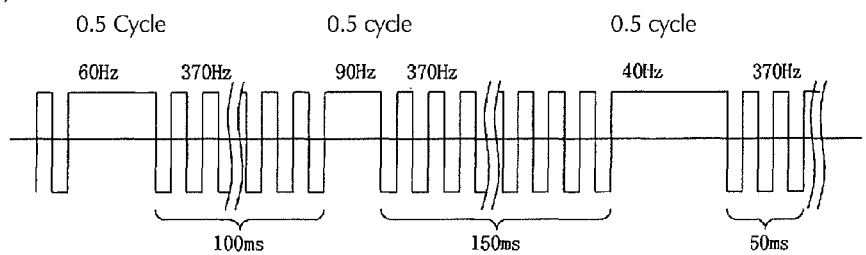

In the present implementation, it is also possible to supply the low frequency while changing the frequency value, as is shown in FIG. 7($a$). Then, it is also possible, such as shown in FIG. 7($b$), to change the insertion interval of the low frequency or to combine these possibilities.

A second embodiment will now be described.

The basis of the drive frequency outputted by the full bridge circuit part U2 in the present implementation is a combination of a high frequency (the basic frequency) and a low frequency being lower than that.

Here, the high frequency is the basic frequency when the high pressure discharge lamp is lighting steadily, and the low frequency is the frequency of the alternating current being supplied at the steady state lighting.

As is disclosed in the prior art example, the basic frequency is selected from a range between 60 and 1000 Hz, and the low frequency is a frequency which is lower that the basic frequency being selected from the range between 60 and 1000 Hz, and which is selected from a range between 5 and 200 Hz.

The low frequency has a duration of at least a half cycle, the low frequency at the time of an alternating generation of the alternating currents with the basic frequency and the low frequency has a length of at most 5 cycles, and the interval from one generation of the alternating current with the low frequency to the next generation of the alternating current with the low frequency is at most 120 seconds. The frequency, the length of the insertion and the interval for the insertion of the low frequency are chosen in relation to the design of the discharge lamp and especially the thermal design of the electrodes.

Such as is described in the patent literature example, by means of supplying an alternating current with a waveform wherein the high frequency and the low frequency are combined, it becomes possible to melt the electrode tip end part by supplying the low frequency alternating current and to prevent the generation of unnecessary projections except the projection becoming the point of origin of the arc.

When the high pressure discharge lamp is steadily lit with a frequency between 60 Hz and 1000 Hz, the formation of a secondary projection in the medium temperature region of the electrode surface starts. This secondary projection is a so-called unnecessary projection which practically makes no contribute to the discharge. When, if the formation of such a secondary projection has occurred, a switching from the frequency of the steady state lighting to a low frequency is performed, the temperature of the electrode tip end rises during the operation as the anode because the period of the operation as the anode is long. This temperature increase is transmitted to the medium temperature region where the secondary projection is generated, and the electrode surface temperature in this region increases because of which the secondary projection having started to form evaporates, is eroded and vanishes.

To suppress the generation and growth of a secondary projection, it is, in essence, important to change the temperature of the electrode surface temporally. If the low frequency is less than 5 Hz, and the low frequency is generated consecutively in intervals of less than 0.01 second, and the low frequency is generated consecutively for more than 5 periods, the temperature increase of the electrode tip end becomes too high, because of which, not only the secondary projection, but also the primary projection (which is necessary and indispensable for the super high pressure discharge lamp of the present invention) vanishes.

On the other hand, if the low frequency exceeds 200 Hz and a low frequency of less than a half cycle is inserted, an insufficient temperature increase of the medium temperature region, where the secondary projection is generated, is obtained, and therefore, the generation and the growth of the secondary projection cannot be suppressed. Also, if the interval of the generation of the low frequency exceeds 120 seconds, the secondary projection grows up to such an extent during the steady state lighting that it will not be eroded.

According to the present embodiment, the range of the basic frequency supplied to the high pressure discharge lamp is between 60 and 1000 Hz. The low frequency alternating current is selected from a range between 5 and 200 Hz and is lower than the frequency of the alternating current with the basic frequency and has a length of at least a half cycle. The length of the low frequency at the time of an alternating generation of the alternating currents with the basic frequency and the low frequency is at most 5 cycles, and the interval from a generation of the alternating current with the low frequency to the next generation of the alternating current with the low frequency is at most 120 seconds. In this manner, it becomes possible to obtain the same result as with the previous embodiment, that is, the result that the generation and the growth of unnecessary projections that do not meaningfully contribute to the discharge can be suppressed perfectly.

The drive signals for the full bridge circuit part U2 are determined in the controller U4 shown in FIG. 3 as follows.

In FIG. 3, first a rectangular wave signal having a duty (on/off rate) of 50% is generated and outputted by the high frequency generating part 60 at a high frequency (the basic frequency). If the R-side is selected by the selector 80 the signal of the high frequency generating part 60 is sent via the selector 80 to the driver 51.

As a result, the gate signals G1 to G4 are supplied from the driver 51 to the switching elements Q1 to Q4 of the full bridge circuit part U2, and the switching elements Q1 to Q4 are driven with a frequency corresponding to the high frequency signal. Then a rectangular wave-shaped alternating current voltage with the frequency of the high frequency signal is generated by the full bridge circuit part U2. This alternating current voltage is supplied to the discharge lamp 10.

The number of cycles of the high frequency signal from the high frequency generating part 60 is counted by the cycle number counter 61. The count set value controller 62 has the function to hold a set value for the cycle number counter 61, and if the number of cycles counted by the cycle number counter 61 corresponds to said set value, that is, when the implementation of the high frequency signal for a specified number of cycles has ended, a signal S' is output by the counter and the selector 80 switches to the S-side. At the same time, the operation of the high frequency generating part 60 is stopped and the low frequency generating part 70 is started.

A rectangular wave signal having a duty of 50% is generated and output from the low frequency generating part 70 at a low frequency. When the selector 80 switches to the S-side, the low frequency signal outputted from the low frequency generating part 70 is sent to the driver 51. By means of this, gate signals G1 to G4 are supplied from the driver 51 to the switching elements Q1 to Q4 of the full bridge circuit part U2, and the switching elements Q1 to Q4 are driven with a frequency corresponding to the low frequency signal. Then, a rectangular wave-shaped alternating current voltage with the frequency of the low frequency signal is generated by the full bridge circuit part U2. This alternating current voltage is supplied to the discharge lamp 10.

At the same time, the number of cycles of the signal from the low frequency generating part 70 is counted by the cycle number counter 71. The count set value controller 72 has the function to hold a set value for the cycle number counter 71, and if the cycle number counter 71 corresponds to said set value, that is, when the implementation of the low frequency signal for a specified number of cycles has ended, a signal R' is output by the counter, the selector 80 switches to the R-side and the low frequency generating part 70 is stopped and the high frequency generating part 60 is started. In this manner, an output from the high frequency generating part 60 to the driver 51 is performed, the full bridge circuit part U2 again outputs the alternating current voltage with the high frequency.

In the following, the example established in the foregoing is shown.

high frequency generating part 60: 370 Hz
count set value controller 62: 100.5 cycles
low frequency generating part 70: 90 Hz
count set value controller 72: 1 cycle The control process of the present embodiment is characterized in that the set value for the count set value controller is controlled sequentially in the course of time and it is possible to change it during lighting.

Figure 8A:
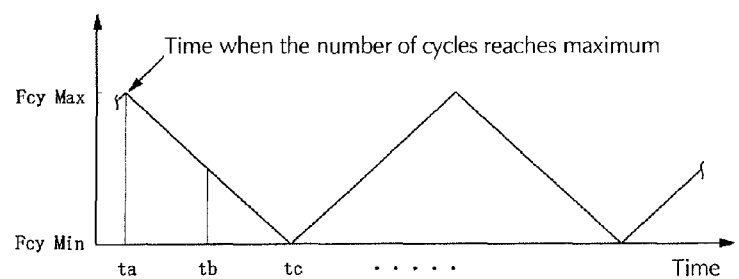
FIGS. 8(a) & 8(b) are views showing an example of the pattern of change of the set value for the number of cycles with the basic frequency and an example of the waveform of the lamp current supplied to the high pressure discharge lamp, respectively.
Figure 8B:
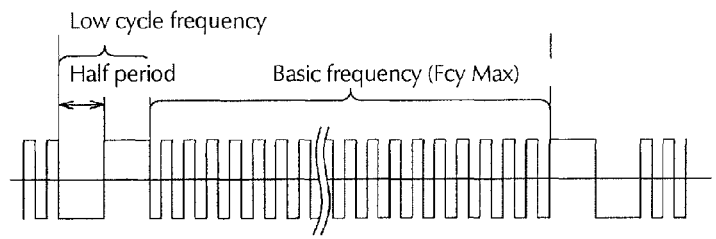
Figure 9A:
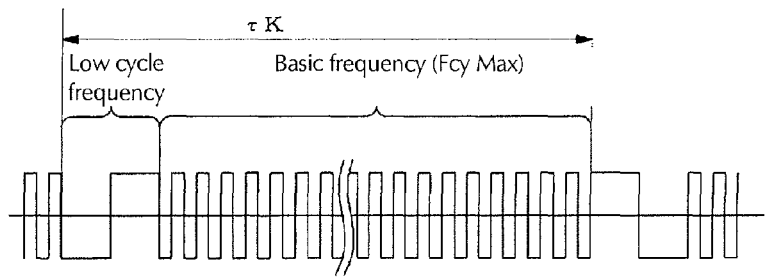
FIGS. 9(a)-9(d) are views showing an example of the waveform of the lamp current supplied to the high pressure discharge lamp from a power supply device according to a second embodiment of the present invention.
Figure 9B:
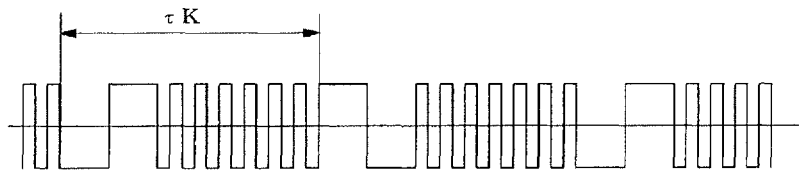
Figure 9C:
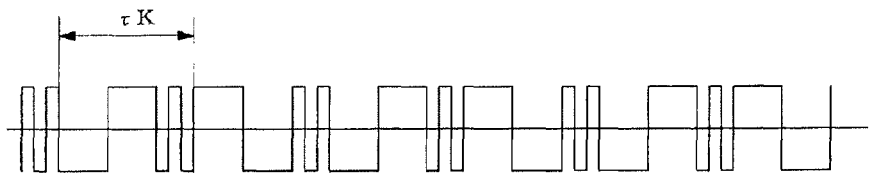
Figure 9D:
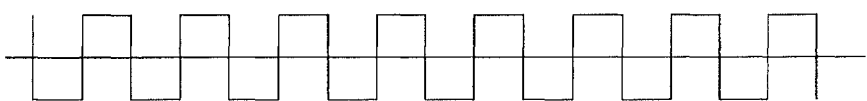

FIG. 8(a) shows an example of the change pattern of the set value for the number of cycles of the basic frequency wherein the vertical axis represents the number (times) of generation cycles of the basic frequency and the horizontal axis expresses the time. FIG. 8(b) shows an example of the waveform of the lamp current supplied to the high pressure discharge lamp 10 from the supply device 30, wherein the vertical axis represents the current value and the horizontal axis represents the time.

As is shown in FIG. 8(a), the period during which the high frequency (basic frequency) is output can be shortened gradually by changing the set value such that it is reduced with a rate of change of 1 cycle with every 1 second from the number of maximum cycles Fcy Max having been set in advance. When the number of minimum cycles Fcy Min having been set in advance is reached as the result of the reduction, it is possible to extend the period during which the high frequency is outputted gradually by an increase of 1 cycle with every 1 second.

This explanation uses a rate of change of 1 cycle with every 1 second as an example, but there is no limitation to these values which can be set arbitrarily. Here, also a count set value controller 72 for the low frequency is provided, and this value may also be a fixed numerical value of for example, 1 cycle or 0.5 cycle.

Desirably, the time of the generation of the basic frequency and the rate of change of the basic frequency are set such that the following conditions 1 and 2 are satisfied.

Condition 1: At the time at which the number of cycles reaches the maximum, the time of generation of the basic frequency is made at least twice and at most a thousand times the half cycle(s) of the low cycle frequency.

Condition 2: When the time being necessary for increasing or decreasing the number of cycles of the basic frequency for one cycle is referred to as 'cycle increase/decrease speed (s)', this cycle increase/decrease speed(s) is set to at least 0.5 s and at most 10 s. When, for example, the cycle increase/decrease speed is 1 s, the number of cycles of the basic frequency is increased or decreased for 1 cycle with the passing of each 1 s.

Reason for Condition 1

Condition 1 is set for the following reasons.

To keep the shape of the projections good, it is necessary to set the period of the consecutive formation of the basic frequency at the time (Fcy Max) shown in FIG. 8(a), at which the number of cycles of the basic frequency reaches the maximum, to an appropriate range.

If the period of the generation of the basic frequency is too short at the time the number of cycles of the basic frequency reaches the maximum, the width between Fcy Max and Fcy Min becomes small and similar to having almost no swing width, because of which the tip end of the electrode tapers and the shape of the projection becomes distorted. To avoid such a problem, it is desirable to set the period of the generation of the basic frequency to at least twice the half cycle of the low cycle frequency.

On the other hand, if the period of the generation of the basic frequency is too long, the time from one generation of the low frequency to the next generation of the low frequency becomes long, the temperature of the electrode becomes low, the region with a low load becomes too long, the wear-off mode occurs and the shape of the projection becomes distorted.

Therefore it is considered desirable to set a range of at most a thousand times for the period of the generation of the basic frequency.

Reason for Condition 2

Condition 2 is set for the following reasons.

If the cycle increase/decrease speed is too fast, the electrode temperature cannot follow the change thereof, the effect of the swing is not obtained and the shape of the projection becomes distorted.

If the cycle increase/decrease speed is, for example, 0.2 s, there are 5 cycle increases/decreases during 1 s. In this case, it is not possible to change the temperature of the electrode tip end smoothly. There is no effect of the swing, and the temperature of the electrode tip end cannot be heated within a wide range. The electrode tip end shape becomes disordered and it is not possible to maintain a stable discharge.

When the cycle increase/decrease speed becomes 0.5 s (2 cycle increases/decreases during 1 s), it becomes possible that the temperature of the electrode tip end follows the cycle increases/decreases, and the electrode tip end temperature can be heated within a wide range. As the result, the projection of the tip end can be maintained.

It is desirable to set the increase/decrease speed of the interval of the generation of the low cycle frequency (the time at which the basic frequency is increased/decreased for 1 cycle) to at least 0.5 s.

On the other hand, if the cycle increase/decrease speed is too slow, the time of the high load from the electrode, in other words the state of a low electrode temperature, becomes too long and the projection at the tip end becomes distorted.

If the cycle increase/decrease speed is, for example, 20 s (increase or decrease for one cycle with the passing of each 20 s), a decrease of the electrode temperature is induced because the time of the high load is long, and the projection of the tip end cannot be maintained. When the cycle increase/decrease speed becomes 10 s (increase or decrease for one cycle with the passing of each 10 s), it becomes possible to control the low temperature and high temperature of the electrode tip end temperature and the projection of the tip end can be maintained.

Therefore, is desirable to set the increase/decrease speed of the interval of the generation of the low cycle frequency (the time at which the basic frequency is increased/decreased for 1 cycle) to at most 10 s. As long as these set values satisfy the necessary conditions, of course also settings for a step-wise increase or decrease of a plurality of cycles—2 cycles or 3 cycles—are possible.

Then, although a detailed explanation thereof will be omitted, there may also be a combination with a technique whereby the frequency of the high frequency generating part or the frequency of the low frequency generating part is changed depending on the lamp voltage value or the lamp current value, and similarly, also an implementation is possible wherein parameters regarding the change of each set value (Fcy Max, Fcy Min) for the number of cycles of the count set value controllers 62, 67 or of the rate of change in dependence of the lamp voltage or the lamp current are tabulated and the optimal parameters can be selected.

In the following, concrete examples of the current waveform pattern of the present implementation and the change pattern of the set value for the number of cycles in the count set value controller 62 will be explained.

The specification of the lamp used in the embodiments explained below and the operating conditions of the lamp are as follows.

Specification of the Lamp According to the Embodiments
  rated power: 270 W
  rated voltage: 80 V
  internal volume of the light emission part: 80 mm$^3$
  electrode spacing: 1.2 mm
Enclosed Substances
  amount of mercury: 0.28 mg/mm$^3$
  noble gas (concretely argon gas): 13 kPa
  halogen amount (e.g., iodine, bromine, chlorine): $10^{-6}$ to $10^{-2}$ μmol/mm$^3$
Operating Conditions of the Lamps
  basic frequency: 370 Hz
  low cycle frequency: 46.25 Hz, 92 Hz
  minimum insertion interval of low frequency: 0 ms
  maximum insertion interval of low frequency: 300 ms
  cycle increase/decrease speed: 1 cycle/2 s
Embodiment 1: The Number of Times that Generation of the Basic Frequency Becomes 0

Figure 10:
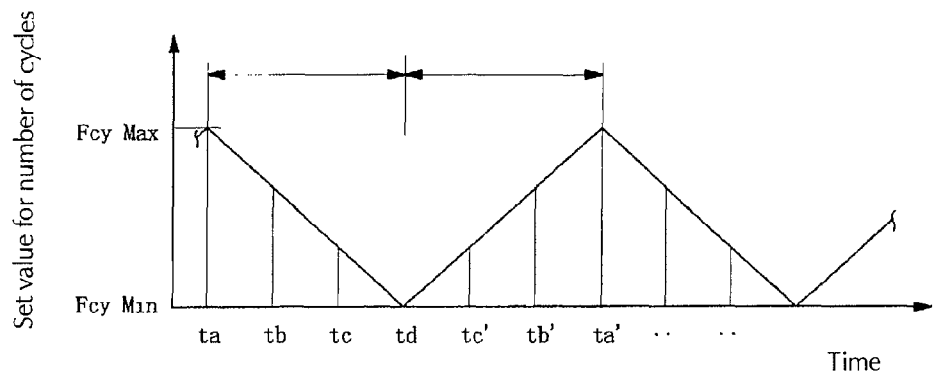
FIG. 10 is a view for explaining the pattern of change of the set value used for the current waveform control according to the second embodiment of the present invention.

FIG. 9 shows an example of the waveform of the lamp current supplied to the high pressure discharge lamp 10 from the supply device 30, wherein the vertical axis represents the current value and the horizontal axis expresses the time. FIG. 10 is a view explaining the state of the change of the set value for the number of cycles used to control this current waveform, wherein the vertical axis represents the number of cycles (times) the basic frequency is generated and the horizontal axis expresses the time.

When the time changes like ta, tb, tc, td, . . . such as in FIG. 10, and the set value of the number of cycles changes, the current waveform appears in the sequence (a)→(b)→(c)→(d), such as shown in FIG. 9. When afterwards the time becomes tc', tb', ta' after td, there is the change of (d)→(c)→(b)→(a) in FIG. 9.

The example shown in FIG. 9(*a*) is the case of the largest number of cycles of the basic frequency (Fcy Max) in the state of operating by a combination of the alternating current with the basic frequency (high frequency) and the alternating current with the low frequency, and the waveform where the period (τK) of the supply of the basic frequency is the longest (in other words, the number of times of the generation of the low frequency alternating current is the lowest).

By means of changing the set value from this waveform (a) such that it is reduced from the maximum number of cycles (Fcy Max) (which was set in advance) with a rate of change of 1 cycle for each specified time (for example, for each 1 second), the waveform is changed in the sequence from (b) to (d).

As to concrete numeric values for the above embodiment, the value of the basic frequency is 370 Hz and the value of the low cycle frequency is 92 Hz. In the state (a), Fcy Max is 37 (cycles) (in time 100 ms) and Fcy Min is 0 (cycles). The number of generations of the low cycle frequency in FIG. 9(*a*) to FIG. 9(*c*) is 1 cycle.

As is shown in FIG. 10, the minimum number of cycles (Fcy Min, in this case 0) is reached from the maximum number of cycles (Fcy Max) by gradually shortening the period during which the high frequency is outputted with a constant speed. Afterwards, it is changed with the constant speed until the maximum cycle number is reached again. By changing the period of the supply of the alternating current with the high frequency in this way, the number of times of the generation of the alternating current with the low frequency is increased and decreased. The drawing is merely an example, and there is no limitation to this kind of change.

Figure 11A:
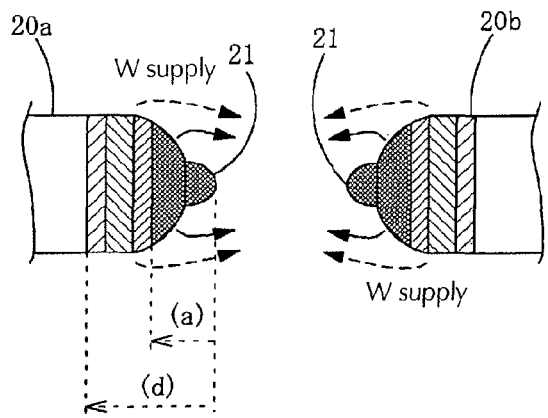
FIGS. 11(a) & 11(b) are views of the electrode tip ends for explaining the temperature state and the wear state of the electrode tip ends according to the second embodiment of the present invention.
Figure 11B:
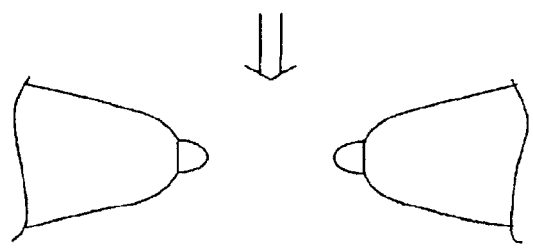

FIG. 11 is a view explaining the state of the temperature change of the electrode tip ends.

If the period (τK) from one generation of the low cycle frequency to the next generation of the low cycle frequency is comparatively long, the number of times the low frequency is output per unit time is small, and therefore, the region being heated in the vicinity of the tip end of the electrode 20*a* is confined to a relatively frontal region (the portion (a)). At this time, the temperature of the projection 21 is relatively low and tungsten (W) is built-up with regard to the projection (W build-up mode).

When the number of times of the output of the high frequency gradually decreases and the output of the low frequency gradually increases, the frequency of the occurrence of a high temperature at the electrode increases, the temperature of the projection becomes high, and the region being heated of the electrode tip end extends rearwards.

When the period of the output of the basic frequency reaches the minimum cycle value (Fcy Min), the region being heated in the vicinity of the tip end of the electrode 20*a* reaches its maximum size and extends for example, up to the rear portion (d) of the electrode 20*a*. Melting of tungsten making up the projection part 21 of the electrode tip end occurs (W melting mode).

According to the present implementation, the region being heated of the electrode changes by constantly changing the number of times of the generation of the low frequency by means of increasing and decreasing the number of cycles of the high frequency. As the result, it becomes possible to maintain the shape of the electrode tip end optimally even if the lamp is lighted for a long time. As, in this embodiment, the period of the basic frequency is changed slowly and gradually, abrupt changes of the shape of the tip end part hardly occur and also abrupt changes of the voltage hardly occur.

An embodiment in which the number of times that the basic frequency is generated does not become 0 will now be described.

Figure 12:
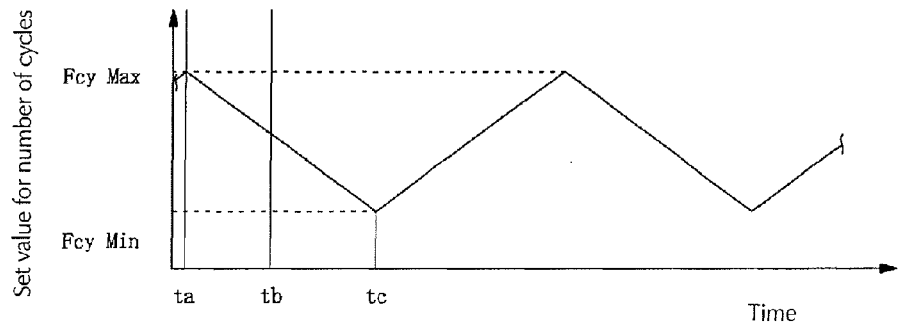
FIG. 12 is a view showing for explaining the state of the change of the set value used for the current waveform control for another example according to the second embodiment of the present invention.

FIG. 12 is another example of the set values used to control the current waveform, wherein the vertical axis represents the number of cycles (times) of the generation of the basic frequency and the horizontal axis expresses the time. Then, FIGS. 13(*a*)-13(*c*) are an example of the current waveform of the lamp where the vertical axis represents the current value and the horizontal axis represents time.

Figure 13A:
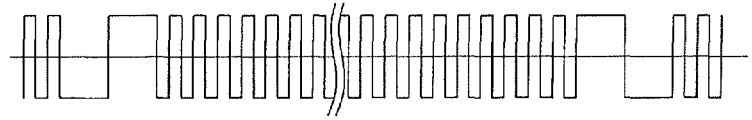
FIGS. 13(a)-13(c) are views showing another example of the waveform of the lamp current according to the second embodiment of the present invention.
Figure 13B:
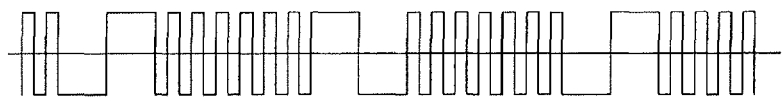
Figure 13C:
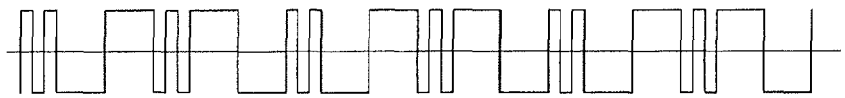
Figure 14A:
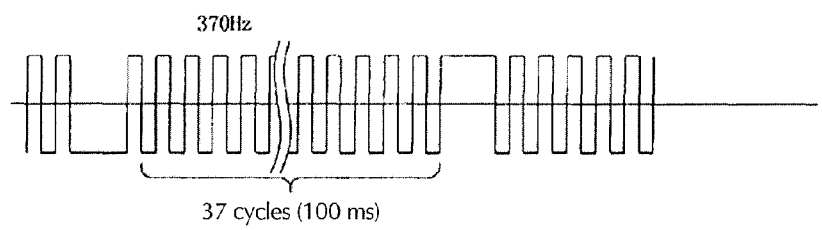
FIGS. 14(a)-14(d) are views showing another example of the waveform of the lamp current according to the second embodiment of the present invention.
Figure 14B:
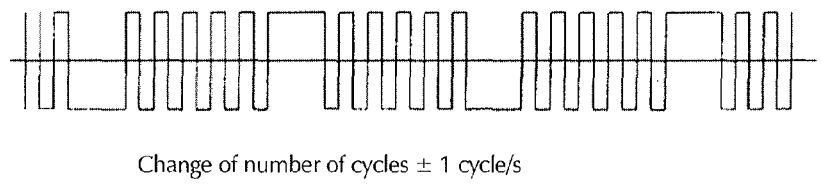
Figure 14C:
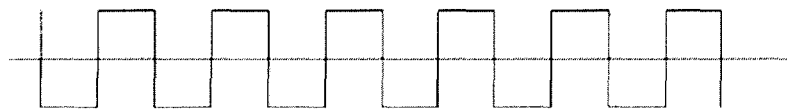
Figure 14D:
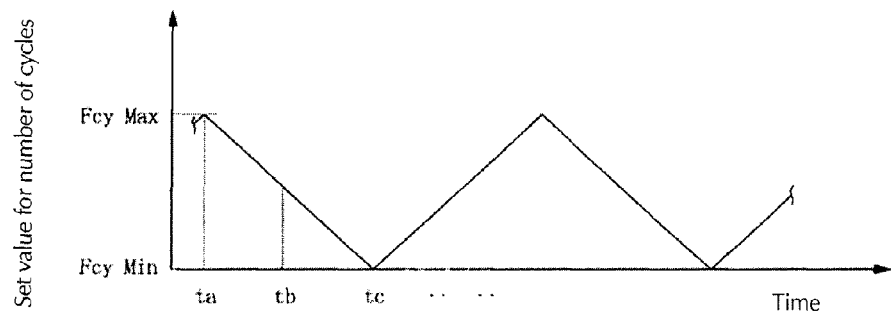

When the time changes like ta, tb, tc . . . such as is shown in FIG. 12, the waveform of FIG. 13 changes in the sequence 13(*a*)→13(*b*)→13(*c*), and when the period of the output of the basic frequency reaches the minimum cycle number (Fcy Min) at the time tc, the waveform of FIG. 13 changes in the sequence 13(*c*)→13(*b*)→13(*a*).

FIG. 14 is another example of the current waveform of the lamp, wherein the vertical axis represents the current value and the horizontal axis expresses the time.

In this example, the generation cycle of the low cycle frequency is 0.5, that is, a half cycle, and the polarity is reverted with each generation of the low frequency (that is, alternatingly). The set value for the number of cycles used for the control with this current waveform is shown in FIG. 14(*d*).

That is, when the time changes like ta, tb, tc . . . , the waveform of changes in the sequence 14(*a*)→14(*b*)→14(*c*), and when the period of the output of the basic frequency reaches the minimum cycle number (Fcy Min) at the time tc, the waveform changes in the sequence 14(*c*)→14(*b*)→14(*a*). Of course, it is also possible perform a control such that the basic frequency is generated as in FIGS. 13(*a*)-13(*c*).

Figure 15A:
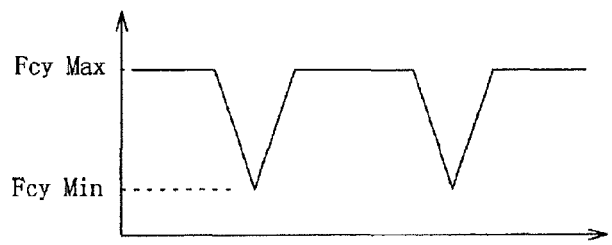
FIG. 15(a)-15(c) is a view showing another example of the pattern of change of the set value used for the current waveform control according to the second embodiment of the present invention.
Figure 15B:
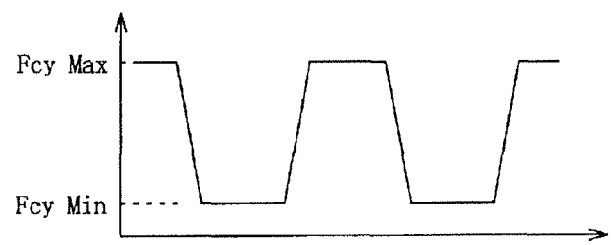
Figure 15C:
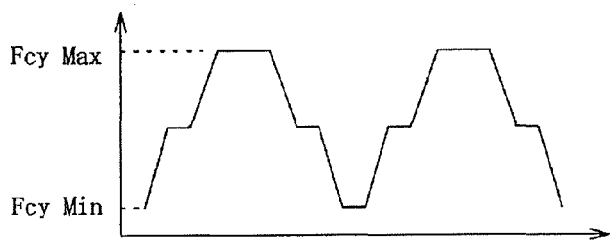
Figure 16A:
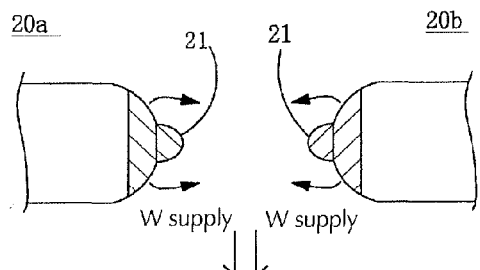
FIGS. 16(a) & 16(b) are views for explaining the temperature state and the wear state of the electrode tip ends according to the state of the art.
Figure 16B:
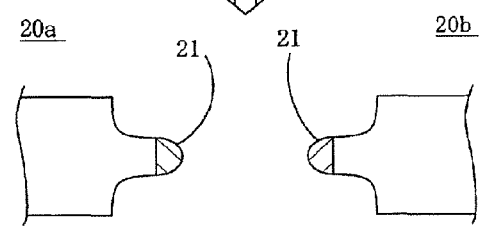

FIG. 15(a) to (c) show another example of the cycle set value. In these drawings the vertical axis represents the number of cycles (times) of the generation of the basic frequency, and the horizontal axis expresses the time.

FIG. 15(a) is a representation wherein the period of the generation of the high frequency is increased with a constant speed from the minimum cycle number (Fcy Min). When the maximum cycle number (Fcy Max) is reached, it is held in this state for a specified time at this maximum cycle number, and afterwards, the period of the generation of the high frequency is decreased gradually with a constant speed from the maximum cycle number (Fcy Max).

FIG. 15(b) is a representation wherein the period of the generation of the high frequency is increased with a constant speed from the minimum cycle number (Fcy Min) until the maximum cycle number (Fcy Max) is reached. When the maximum cycle number is reached, it is held in this state for a specified time at this maximum cycle number, and afterwards, the period of the generation of the high frequency is decreased gradually with a constant speed from the maximum cycle number (Fcy Max). When the minimum cycle number (Fcy Min) is reached, it is held in the state for a specified time.

FIG. 15(c) is a representation wherein, when a specified cycle number is reached in the process of the increase from the minimum cycle number (Fcy Min) to the maximum cycle number (Fcy Max) in example (b), this state is maintained for a specified time, and when a specified cycle number is reached in the process of the decrease from the maximum cycle number (Fcy Max) to the minimum cycle number (Fcy Min), this state is maintained for a specified time.

As to these parameters, in practice the optimal parameters are determined experimentally in advance according to the specification of the lamp, and the control shown in FIGS. 15(a)-15(c) can be implemented by storing the parameters in the count set value controllers 62, 72.

The present invention has been explained in the foregoing, but it goes without saying that the present invention is not limited to the above mentioned specifics, and various changes can be made as will be apparent to those of ordinary skill in the art. For example, each part of the electrodes, etc. of the high pressure discharge lamp can be adapted suitably. Further, it is possible to apply the present invention to other types of high pressure discharge lamp lighting devices besides those used for projectors, and to apply it also for devices being provided with high pressure discharge lamps with an enclosed amount of mercury of less than 0.20 mg/mm$^3$ (for example, 0.12 mg/mm$^3$ to 0.20 mg/mm$^3$) from which generally the same behavior is demanded.

What is claimed is:

1. A high pressure discharge lamp lighting device comprising
   a high pressure discharge lamp having mercury and a pair of opposed electrodes disposed within a discharge vessel made from quartz glass, and
   a power supply device supplying an alternating current to this discharge lamp, wherein:
   said power supply device alternately supplies a basic frequency at a time of steady state lighting and a low frequency that is lower than the basic frequency;
   said alternating current with the basic frequency is an alternating current with a frequency in a range of between 60 and 1000 Hz;
   said alternating current with the low frequency consists of half cycle wave in a range between 5 and 200 Hz, and is provided with an interval from one generation of the low frequency to a next generation of the low frequency that is at most 120 seconds;
   wherein said power supply device supplies the waveform with the low frequency having a specific polarity at least twice consecutively sandwiching only the waveform with the basic frequency between the supplied wave forms with the low frequency and without a polarity change.

2. The high pressure discharge lamp lighting device according to claim 1,
   wherein said power supply device changes the polarity of the half cycle waveform with the low frequency, and
   wherein the period of the consecutive insertion of the low frequency without polarity change is at least 0.5 s and at most 20 s.

3. The high pressure discharge lamp lighting device according to claim 2,
   wherein said power supply device controls the value of the low frequency such that it is gradually increased over a specified time such that it approximates the value of the basic frequency before switching the polarity of the half cycle waveform with the low frequency, and
   wherein said power supply device controls the value of the low frequency such that it is gradually decreased after switching the polarity of the half cycle waveform with the low frequency, preferably gradually decreased to the initial value of the low frequency.

4. A high pressure discharge lamp lighting device comprising:
   a high pressure discharge lamp having mercury and a pair of opposed electrodes disposed within a discharge vessel made from quartz glass, and
   a power supply device supplying an alternating current to this discharge lamp, wherein;
   said power supply device alternately supplies a basic frequency at a time of steady state lighting and a low frequency that is lower than the basic frequency;
   said alternating current with the basic frequency is an alternating current with a frequency in a range of between 60 and 1000 Hz;
   said alternating current with the low frequency consists of a half cycle wave in a range between 5 and 200 Hz, and is provided with an interval from one generation of the low frequency to a next generation of the low frequency that is at most 120 seconds;
   wherein said power supply device supplies the waveform with the low frequency having a specific polarity at least twice consecutively sandwiching the waveform with the basic frequency and without a polarity change,
   wherein said power supply device comprises a control part comprising:
   a high frequency generating part generating a signal with the basic frequency;
   a first cycle number counter counting a number of cycles of the basic frequency signal outputted by the high frequency generating part;
   a first count set value control part holding a set value for the count value of the high frequency signal outputted by the high frequency generating part;
   a low frequency generating part generating a signal with the low frequency;
   a second cycle number counter counting a number of cycles of the low frequency signal outputted by the low frequency generating part;
   a second count set value control part holding a set value for the count value of the low frequency signal outputted by the low frequency generating part; and
   a selector which selectively outputs one of the outputs of the high frequency generating part and the low frequency generating part to a driver.

5. A high pressure discharge lamp lighting device comprising:
   a high pressure discharge lamp having mercury and a pair of opposed electrodes disposed within a discharge vessel made of quartz glass, a power supply device supplying an alternating current to this discharge lamp, wherein:

said power supply device alternately supplies a basic frequency at a time of steady state lighting and a low frequency that is lower than the basic frequency;

said alternating current with the basic frequency is in a range of between 60 and 1000Hz;

said alternating current with the low frequency comprises at least a half cycle wave in a range between 5 and 200 Hz, and is provided with an interval from one generation of the low frequency to a next generation of the low frequency current that is at most 120 seconds wherein said power supply device supplies the alternating current to the high pressure discharge lamp in a manner such that intervals during which the basic frequency is supplied are gradually increased and decreased at specified times.

6. The high pressure discharge lamp lighting device according to claim 5, wherein the intervals during which the basic frequency is supplied are gradually increased and decreased at specific times by increasing and decreasing a generation cycle number of the basic frequency.

7. A high pressure discharge lamp lighting device comprising:

a high pressure discharge lamp having mercury and a pair of opposed electrodes disposed within a discharge vessel made from quartz glass, and a power supply device supplying an alternating current to this discharge lamp, wherein;

said power supply device alternately supplies a basic frequency at a time of steady state lighting and a low frequency that is lower than the basic frequency;

said alternating current with the basic frequency is an alternating current with a frequency in a range of between 60 and 1000 Hz;

said alternating current with the low frequency consists of a half cycle wave in a range between 5 and 200 Hz, and is provided with an interval from one generation of the low frequency to a next generation of the low frequency that is at most 120 seconds;

wherein said power supply device supplies the alternating current to the high pressure discharge lamp in a manner such that intervals during which the basic frequency is supplied are gradually increased and decreased at specified times, wherein said power supply device comprises a control part comprising:

a high frequency generating part generating the signal with the basic frequency;

a first cycle number counter counting the number of cycles of the basic frequency signal outputted by the high frequency generating part;

a first count set value control part holding a set value for the count value of the high frequency signal outputted by the high frequency generating part;

a low frequency generating part generating the signal with the low frequency;

a second cycle number counter counting the number of cycles of the low frequency signal outputted by the low frequency generating part;

a second count set value control part holding a set value for the count value of the low frequency signal outputted by the low frequency generating part; and a selector which selectively outputs one of the outputs of the high frequency generating part and the low frequency generating part to a driver.

8. A method of operating a high pressure discharge lamp lighting device comprising a high pressure discharge lamp having mercury and a pair of opposed electrodes disposed within a discharge vessel made of quartz glass using a power supply device supplying alternating current to this discharge lamp, comprising the steps of:

supplying a basic frequency at a time of steady state lighting;

supplying a low frequency, that is lower than the basic frequency, consisting of a half cycle wave in a range between 5 and 200 Hz, the low frequency being supplied alternately with said basic frequency and with an interval from one generation of the low frequency to a next generation of the low frequency that is at most 120 seconds;

wherein said power supply device supplies the waveform with the low frequency having a specific polarity such that it appears at least twice consecutively sandwiching only the waveform with the basic frequency between the supplied waveform with the low frequency and without polarity change.

9. A method of operating a high pressure discharge lamp lighting device comprising a high pressure discharge lamp having mercury and a pair of opposed electrodes disposed within a discharge vessel made of quartz glass using a power supply device supplying alternating current to this discharge lamp, comprising the steps of:

supplying a basic frequency at a time of steady state lighting;

supplying a low frequency, that is lower than the basic frequency, comprising at least a half cycle wave in a range between 5 and 200 Hz, the low frequency being supplied alternately with said basic frequency and with an interval from one generation of the low frequency to a next generation of the low frequency that is at most 120 seconds;

wherein said power supply device supplies the alternating current to the high pressure discharge lamp in a manner such that intervals during which the basic frequency is supplied are gradually increased and decreased at specified times.

* * * * *